United States Patent [19]

Knight

[11] Patent Number: 5,314,754

[45] Date of Patent: May 24, 1994

[54] STARCH DERIVED SHAPED ARTICLES

[75] Inventor: Adrian T. Knight, Lane Cove, Australia

[73] Assignee: Goodman Fielder Wattie Australia Limited, Gladsville, Australia

[21] Appl. No.: 777,331

[22] PCT Filed: Jun. 1, 1990

[86] PCT No.: PCT/AU90/00237

§ 371 Date: Nov. 25, 1991

§ 102(e) Date: Nov. 25, 1991

[87] PCT Pub. No.: WO90/14938

PCT Pub. Date: Dec. 13, 1990

[30] Foreign Application Priority Data

Jun. 1, 1989 [AU] Australia ............... PJ4504
Jun. 1, 1989 [AU] Australia ............... PJ4505

[51] Int. Cl.⁵ ............... B32B 23/00; C08B 31/00
[52] U.S. Cl. ............... 428/532; 264/101; 264/186; 264/211; 106/210
[58] Field of Search ............... 264/186, 211, 514, 526, 264/210.6, 140, 87, 101, 102, 217, 190, 200, 203; 425/203; 106/213, 210; 428/532

[56] References Cited

U.S. PATENT DOCUMENTS

| | | | |
|---|---|---|---|
| 2,570,449 | 10/1951 | Horsák | 264/186 |
| 2,608,723 | 9/1952 | Wolff et al. | 264/217 |
| 2,656,571 | 10/1953 | Davis et al. | 264/217 |
| 2,822,581 | 9/1958 | Muetgeert et al. | 264/217 |
| 3,030,667 | 4/1962 | Kunz | 264/211 |
| 3,117,014 | 1/1964 | Klug | 106/213 |
| 3,137,592 | 6/1964 | Protzman et al. | 127/71 |
| 3,229,005 | 1/1966 | Reifenhauser | 264/514 |
| 3,243,308 | 3/1966 | Barger et al. | 264/210.6 |
| 3,344,216 | 9/1967 | Protzman et al. | 264/93 |
| 3,410,938 | 11/1968 | Schippers | 425/203 |
| 3,499,074 | 3/1970 | Barger et al. | 264/204 |
| 3,633,880 | 1/1972 | Newmark | 425/203 |
| 3,734,760 | 5/1973 | Hijiya et al. | 106/210 |
| 3,891,624 | 6/1975 | Boonstra et al. | 536/111 |
| 3,997,703 | 12/1976 | Nakashio et al. | 264/186 |
| 4,010,229 | 3/1977 | Pleska et al. | 264/140 |
| 4,133,784 | 1/1979 | Otey et al. | 260/17.4 |
| 4,454,268 | 6/1984 | Otey et al. | 524/47 |
| 4,626,183 | 12/1986 | Shirai et al. | 264/514 |
| 4,722,680 | 2/1988 | Rossberger et al. | 425/203 |
| 4,820,469 | 4/1989 | Walsh et al. | 264/514 |
| 4,853,168 | 8/1989 | Eden et al. | 264/211 |
| 4,863,655 | 9/1989 | Lacourse et al. | 264/186 |
| 4,900,494 | 2/1990 | Wobbe | 425/203 |
| 5,024,531 | 6/1991 | Will | 425/203 |
| 5,035,930 | 7/1991 | Lacourse et al. | 264/186 |
| 5,043,196 | 8/1991 | Lacourse et al. | 264/186 |
| 5,051,222 | 9/1991 | Marten et al. | 264/185 |
| 5,133,909 | 7/1992 | Suominen | 264/211 |

FOREIGN PATENT DOCUMENTS

| | | | |
|---|---|---|---|
| 2001533 | 7/1971 | Fed. Rep. of Germany | 264/186 |
| 50-87453 | 7/1975 | Japan | 264/186 |
| 50-105766 | 8/1975 | Japan | 264/186 |
| 847431 | 4/1958 | United Kingdom | 264/186 |
| 965349 | 7/1964 | United Kingdom . | |
| 1008042 | 10/1965 | United Kingdom . | |
| 1075001 | 7/1967 | United Kingdom . | |
| 1137290 | 12/1968 | United Kingdom . | |
| 2208651 | 4/1989 | United Kingdom . | |

OTHER PUBLICATIONS

Derwent Publication AN 76-06351X.

Primary Examiner—Jay H. Woo
Assistant Examiner—Duane S. Smith
Attorney, Agent, or Firm—Marshall, O'Toole, Gerstein, Murray & Borun

[57] ABSTRACT

This invention relates to a method of producing starch derived shaped articles and in particular, a method of producing films derived from high amylose starch. In the method, a hot melt is prepared by heating under pressure a composition comprising a high amylosic material, or a derivative thereof, and sufficient water to provide a homogeneous melt for subsequent extrusion as a shaped article. The hot melt is subjected to an atmospheric or subatmospheric pressure immediately prior to or during extrusion so as to remove water from the hot melt prior to the formation of the shaped article. Preferably, the high amylosic material is derived from Goodman Fielder Mills Pty. Limited maize hybrids 55/77 or 65/88. The starch derived films produced by the method are particularly suitable for use in oxygen barrier laminates and as biodegradable mulch films.

36 Claims, 3 Drawing Sheets

STARCH DERIVED SHAPED ARTICLES

TECHNICAL FIELD

The present invention relates to a method of producing starch derived shaped articles and in particular, a method of producing films derived from high amylose starch. The invention also relates to shaped articles produced by this method and applications of these articles.

BACKGROUND ART

It has long been known that amylosic films may be cast on a surface from a solution of amylosic materials in a solvent, the resultant film being peeled from the surface. However, that method is unsuitable for mass production of amylosic films or for the production of shapes other than films.

In the 1960's various attempts were made to provide more practical methods of manufacture of amylosic films.

U.S. Pat. No. 3,117,014 describes a method of manufacture of shaped articles by forming a hot melt from a mixture of amylaceous material, plasticizer and water. It was shown that plastic flow increased with water content and that it was necessary to retain moisture during extrusion using an unvented extruder.

U.S. Pat. No. 3,243,308 showed that strong flexible edible films could be made by confining amylosic mixtures at high temperatures and under super atmospheric pressures prior to extrusion.

GB Patent No. 965,349 showed that it was advantageous to add from 10% to 50% by weight of water to the amylosic substance prior to extrusion and subsequently to heat and stretch the extruded film.

Notwithstanding the above developments in the early 1960's, and notwithstanding the low cost of amylosic raw materials, the resulting materials have not found widespread acceptance and the extrusion of starch hot melts has not been adopted commercially to any significant extent.

One reason is that although amylose films prepared by the above methods have some useful properties they lack others, in particular mechanical strength and sufficient ability to stretch. The films tend to be hygroscopic and if desired to have a shelf life require to be dried and then lacquered by brush, spray or dipping which is impractical for mass production.

A second reason is that amylose films produced to date have been unsuitable for lamination with other polymers with the result that amylose films have been unable to compete in terms of versatility, or properties with modern co-extruded laminated plastics films in which a plurality of layers each of different polymeric composition, and each layer selected to contribute specific properties, are purpose designed for particular end uses.

Because the elongation before failure of known amylosic films has typically been from about 4% to 20%, the films have not been suitable for use with techniques such as blow moulding, and have been of limited utility in other applications where a greater capacity for elongation is desired.

DISCLOSURE OF THE INVENTION

It is an object of the present invention to provide an improved method for the manufacture of starch derived shaped articles which avoids or at least ameliorates the above discussed deficiencies of prior art.

It is an object of preferred embodiments of the invention to provide an amylosic film suitable for combination with other extruded polymers as laminates.

It is an object of highly preferred embodiments of the invention to provide films which are of improved elongation before failure in comparison with prior amylosic films.

According to one aspect, the invention consists in a method of manufacturing a starch derived shaped article comprising the steps of:

(1) preparing a hot melt by heating under pressure a composition comprising a high amylosic material, or derivative thereof and sufficient water to provide a homogeneous melt, (2) Extruding the hot melt from an extruder to form a shaped article, and (3) Subjecting the hot melt to an atmospheric or sub-atmospheric pressure prior to issue from the extruder or to a sub-atmospheric pressure after issue from the extruder, whereby to remove water from the hot melt.

For the purpose of this specification the term "high amylosic mateiral" means any material having the film forming properties characteristic of amylose. The term includes pure amylose, starch mixtures of amylose with amylopectin containing more than 50% of amylose, and modification of those amylose and starches.

"Derivatives" of high amylosic materials include compositions formed during hot melting or during extruding high amylosic material alone or in combination with plasticizers, cross-linking agents or the like.

Extrusion to form a shaped article includes the formation of films, rods, sheets or the like and includes, as the context admits, extrusion in a blow moulding machine.

It will be understood that high amylosic material such as high amylose starch may contain, as normally dried during preparation, from 9% to 15% by weight of water. The amount of water sufficient to form a homogenous hot melt may be as little as 1% or 2% on a dry starch basis so that no water need be added to perform the invention if sufficient water is present in the high amylosic material as prepared. Reference herein to "high amylose material" and to "starch" unless otherwise specified is a reference to "as prepared" material.

In preferred embodiments of the invention a mixture of a high amylose starch, plasticizer and, if required to produce a homogeneous hot melt added water, are first heated to from 120° C. to 210° C. at a pressure of from 150 to 250 psi, to form a hot melt.

The hot melt is then subjected to a reduced pressure of for example 200 mbar, whereby water is removed to produce a low moisture glassy thermoplastic which is subsequently extruded.

The extrudate is desirably pelletized and the above steps repeated, using the pellets as a high amylosic material derivative. The pellets are formed into a second hot melt which is conveniently subjected to low pressure by use of a vented extruder and is extruded, for example, as a film. The resulting film typically has an elongation before failure in excess of 80% and in some embodiments greater than 200%. If preferred, pellets can be formed into a film by blow moulding. In addition, because of its low water content, the film may be formed into laminates with other polymers, for example by co-extrusion, to produce novel laminates having advantageous properties.

It is highly preferred to select as the high amylosic material a starch derived from maize hybrid 55/77 or 65/88 or derivatives of such starch available from Goodman Fielder Mills Pty. Limited.

Hitherto it has been taught that it was advantageous to have water present in starch during the extruding step and that added water contents of 10% to 50% were preferable. It has also been taught that subjecting the hot melt to high (super atmospheric) pressures is advantageous and that extrusion should be carried out in unvented machines of the kind used for processing starch and rubber products.

The present invention arises from the surprising discovery that it is advantageous to subject the hot melt to an atmospheric or sub-atmospheric pressure prior to extrusion. The sub-atmospheric pressure is advantageously applied at the vent of a vented extruder. It is believed that this flashes off water prior to formation of the product resulting in an extrudate of differing structure from prior art. The resulting extrudate has a high degree of thermoplasticity, is compatible with polymer films (presumably because of its low water content) and is able to be co-extruded with other polymers to form novel laminates.

It has also been found surprisingly, that selection of the preferred high amylose maize starch, which has characteristics differing from similar U.S. high amylose maize starches, results in an extrudate having a higher elongation before failure. The invention extends to include novel products made by the method and to novel uses for those products.

BRIEF DESCRIPTION OF DRAWINGS

Preferred embodiments of the invention will now be described, by way of example only, with reference to the accompanying drawings wherein.

BEST MODES FOR CARRYING OUT INVENTION

In preferred embodiments of the invention, the high amylosic material used is high amylosic maize starch comprising at least 50% by weight of amylose or a modified derivative of this starch. It is highly desirable to select a high amylosic maize starch or modified starch derived from the Goodman Fielder Mills Pty Ltd maize hybrids 55/77 or 65/88 described in detail in "Development of High Amylose Maize Production in Australia" by K. S. McWhirter and C. F. Dunn, Paper 17 No. 5 N. Z. Agronomy Special Publication DSIR Plant Breeding Symposium 1986.

Preferred starches for use in the present invention have been characterised according to two physical properties, rheological behaviour, in particular viscous flow, and their distribution of molecular weights.

The rheological property of viscous flow was measured by determining the change in flow of a dispersion of starch derived from maize hybrids 55/77 and 65/88 in water as a function of temperature. This was done using a Brabender viscograph and the results are represented as Brabender units.

Figure 1:
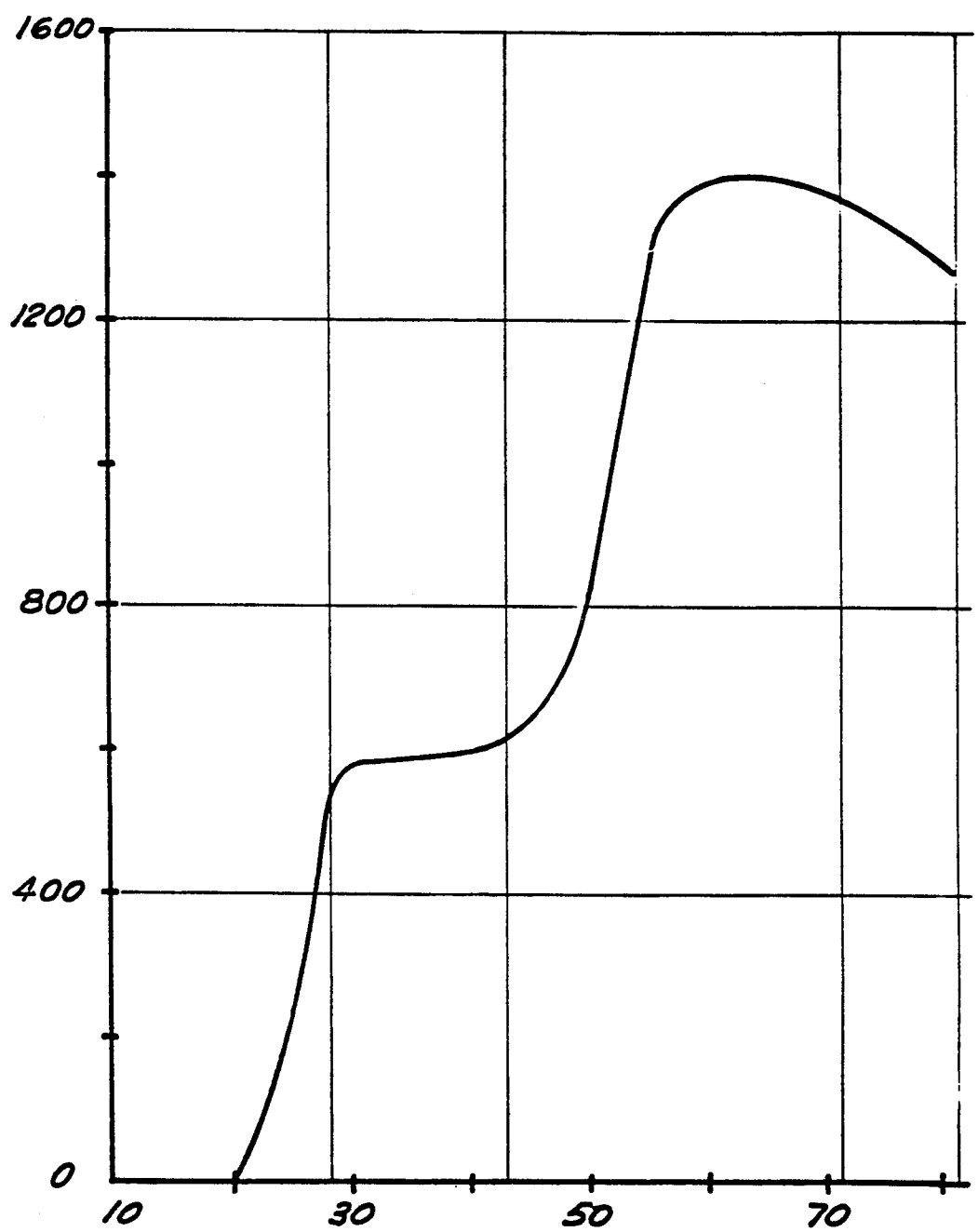
FIG. 1 is a typical Brabender viscograph showing Brabender units on the Y axis and time in minutes on the X axis for a high amylose maize starch slurry comprising 8% starch on a dry solid basis (dsb) in water, said starch being typical of those derived from maize hybrids 55/77 and 65/88.
Figure 2:
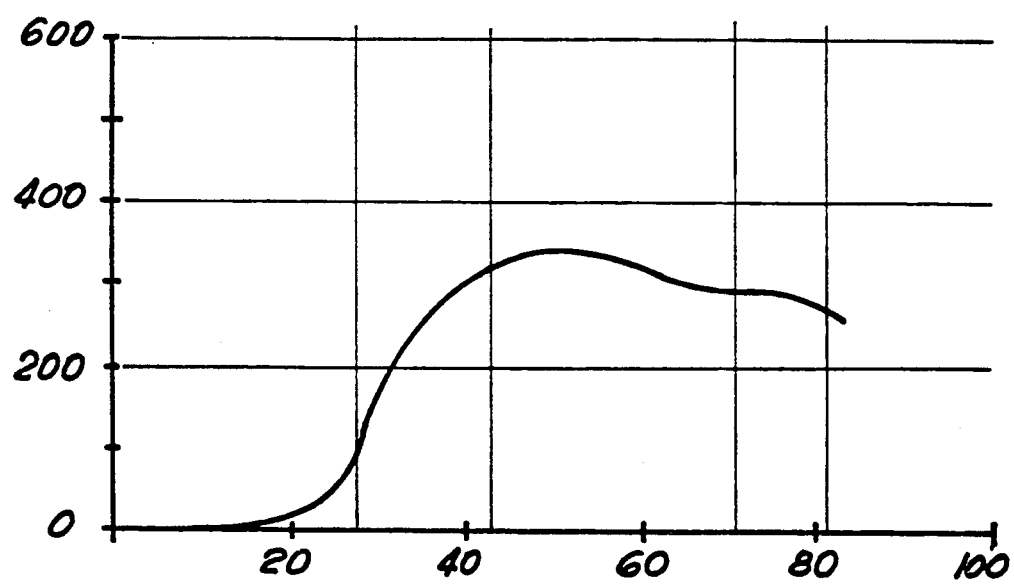
FIG. 2 is a corresponding viscograph typical of high amylose maize starch derived from a U.S. cultivar.

FIGS. 1 and 2 show typical Brabender viscographs for two high amylose maize starch slurries one derived from the Goodman Fielder Mills hybrids discussed above and the other from a U.S. cultivar. Both viscographs were obtained by preparing a slurry comprising 8% starch on a dry solids basis in water and elevating the temperature of the slurry to 50° C. The temperature of the slurry was subsequently elevated at a rate of 1.5° C. per minute over a period of 28 minutes, that is to a temperature of 92° C. This temperature was maintained for 15 minutes and then the temperature of the slurry lowered at a rate of 1.5° C. per minute over a period of 28 minutes, that is to a temperature of 50° which was maintained for a further 10 minutes. Comparison of FIG. 1 with FIG. 2 shows that starches derived from the preferred maize hybrids 55/77 and 65/88 have different rheological properties from typical U.S. high amylose starches.

Figure 3:
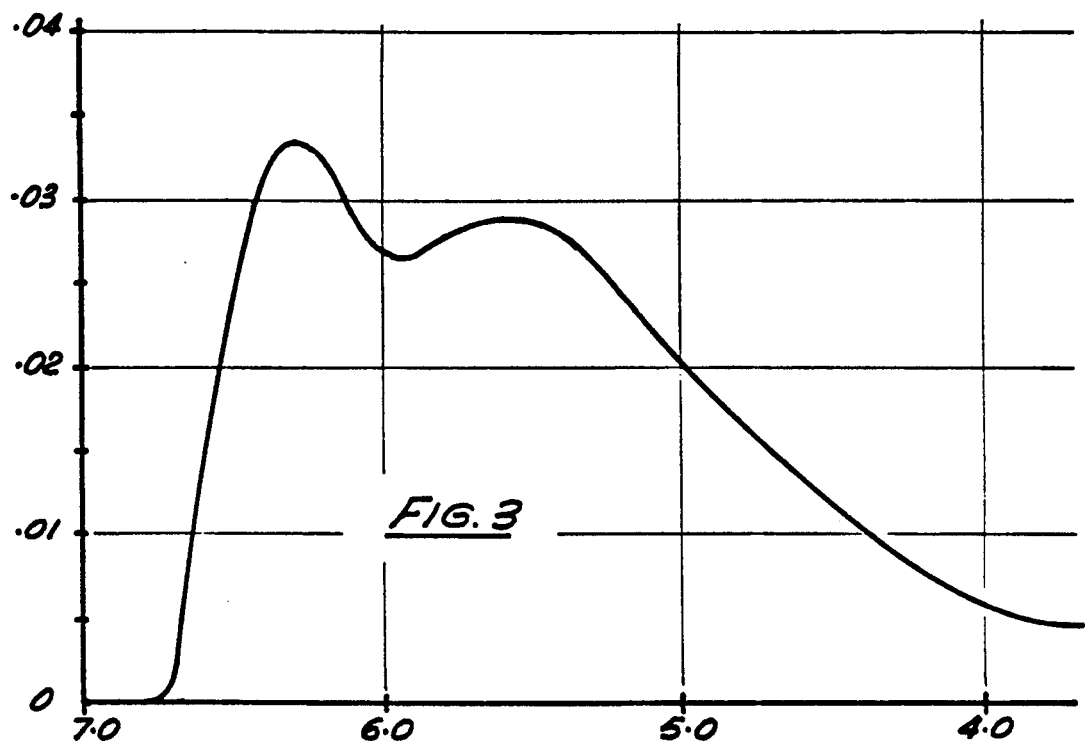
FIG. 3 is a molecular weight profile for a typical high amylose maize starch derived from maize hybrids 55/77 and 65/88 showing response on the Y axis and the log of the molecular weight on the X-axis.
Figure 4:
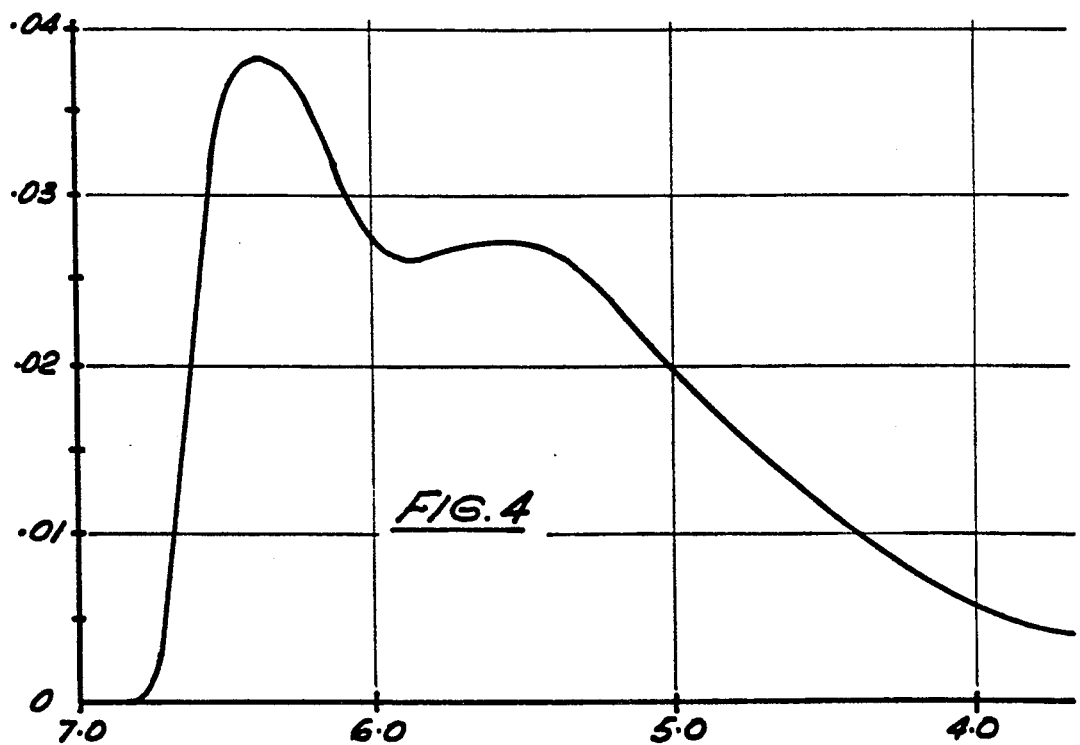
FIG. 4 is a corresponding molecular weight profile typical of a high amylose maize starch derived from a U.S. cultivar.

FIGS. 3 and 4 show molecular weight profiles typical of high amylose maize starch derived maize hybrids 55/77 or 65/88 and a U.S. cultivar respectively. The molecular weight distributions were measured using HPLC gel permeation chromatography. Comparison of FIG. 3 with FIG. 4 shows that starch derived from the preferred maize hybrids 55/77 and 65/88 typically exhibits a different molecular weight distribution from that exhibited by typical U.S. high amylose derived starches.

By modifying the basic starch, it is possible to confer different properties on the extruded product. A large number of derivatives of amylosic materials are suitable for use in the present invention. These include (i) ether derivatives such as a) hydroxyalkyl derivatives, for example hydroxyethyl, hydroxypropyl and hydroxybutyl and b) carboxyalkyl derivatives, for example carboxymethyl, and (ii) ester derivatives such as saturated fatty acid derivatives, for example acetyl. Mixed derivatives are also suitable for use in the present invention. However, carboxymethylated, hydroxypropylated and acetylated high amylose modified maize starch derivatives are preferred.

By selecting the starch modification, both the mechanical and optical properties of the extruded article may be varied. For example, where a carboxymethylated derivative having a carboxyl value of about 2% is used, the film produced is substantially transparent. On the other hand, where acetylated high amylose starch having an acetyl value of about 2.5% or hydroxypropylated high amylose starch having an hydroxypropyl value of up to about 3% are used, higher processing temperatures can be utilized and these result in films having improved handling characteristics in that the hot melt is less fluid and more rubbery in nature.

For a homogeneous hot melt phase to form, it is essential that an amount of water be present in the composition used to form the hot melt. Further, the hot melt composition preferably initially contains water in less than the minimum amount required to dissolve all the amylosic solid material, that is the composition must not contain more than about 50% by weight o water. Desirably the minimum of water required to form a homogeneous hot melt is employed. The amount of water may vary down to a few percent. However, it is emphasised that these amounts represent the total amount of water in the composition used to form the hot melt and not the amount of added water, as amylosic material as normally dried in preparation typically comprises from 9-15% by weight of water. In some cases the residual moisture inherent in the amylosic material used is sufficient to enable the transformation of the mixture into a hot melt and additional water need not be added. Generally, from 0% to 8% by weight of added water is preferred.

In a preferred embodiment of the invention, a powder composition comprising a high amylosic material is first prepared by admixing a high amylosic material, a plasticizer or lubricant if desired and an amount of water in sufficient proportion to form a free-flowing powder. The powder composition is then fed into an extruder and subjected to an elevated temperature under pressure such that a first hot melt forms. The temperatures best suited for this conversion are from about 120° C. to 210° C. The preferred pressure for forming a hot melt is from 60 psi to 2000 psi and preferably from 150 psi to 250 psi. The first hot melt is then subjected to a reduced pressure in the form of vacuum stripping at a pressure of less than 200 mbar immediately prior to shaping or moulding in order to remove water and any other volatiles therefrom. The first hot melt is then shaped or moulded by any conventional process such as dies or rolls and subsequently sets into a relatively hard first extrudate which may be formed into a granular hi9h amylosic composition by a process of pelletization.

The additional compatible plasticizers and lubricants improve both the extrusion characteristics of the extrudable mass and the physical properties of the final shaped product. Plasticizers suitable for use in the present invention are organic compounds containing at least one hydroxy group per molecule, preferably polyhydric alcohols such as polyethylene glycol and glycerol and glycerol acetates. Other plasticizers which may be used include invert sugar, sorbitol and corn syrup. The amount of plasticizer to be used will vary from 0% to approximately 30% by weight of the extrudable mass.

Depending on the particular application of the starch derived shaped articles optional ingredients such as colouring agents, preservatives and bacteriacides may be included in the high amylosic composition so as to be incorporated in the final product. In particular, stabilizers such as carbon black, alumina and calcium carbonate may be included in the composition so as to protect a starch derived film extruded therefrom from ultraviolet light present in sunlight. The inclusion of these stabilizers is particularly desirable where the resulting film is to be used as a biodegradable mulch film described in detail hereinafter.

In accordance with preferred embodiments of the invention, the extrudable granular high amylosic composition obtained from the first extrudate and an amount of water sufficient to form a homogeneous hot melt is subsequently subjected to high temperatures and pressures for conversion into a second hot melt which can be extruded as a film or other shape.

Generally speaking, the temperatures best suited for this conversion are from about 120° C. to 210° C.

As mentioned previously it is essential that an amount of water be present initially in the extrudable mass in order for a homogeneous hot melt phase to form. Where the high amylosic composition is a first extrudate which has previously been subjected to a reduced pressure in order to remove volatiles prior to being fed into the extruder, it is usually necessary to add some water at this stage. The amount of water added to the first extrudate is usually less than about 9% by weight of the mixture and typically about 5.5% by weight.

The extrusion of the second hot melt can be carried out in any conventional extrusion equipment having a facility for reducing the pressure in the final segment of the barrel just before the die to atmospheric or subatmospheric pressures in order to remove volatiles from the extrudable mass prior to extrusion. Preferably this facility enables the pressure to be reduced to subatmospheric and is a vacuum venting facility comprising a vacuum pump in fluid communication with a volatiles outlet port disposed in the final segment of the barrel just before the die. A single rotor screw pump which retains the extrudable mass yet allows the passage of vapour is disposed in the barrel opening of the outlet so as to prevent the egress of the extrudable mass therethrough. Typically, the fitted vacuum pump allows the pressure in the final segment to be reduced to at least about 200 mbar. Surprisingly, the starch melt remains fluid and processable through the die even though the water has been substantially removed from the extrudable mass.

The plastic extrudable mass is then emitted from the extrusion orifice or flat die as a second extrudate, for example in the form of a film.

The film is preferably taken up on heated rollers which are maintained at a temperature of typically 70° C. in order to remove any remaining water from the film by evaporation.

The film emitted from the extrusion die is highly elastic and can, if desired, be stretched either in a direction parallel with the extrusion axis or normal to the axis. Preferably, the film is stretched by tension derived, for example, from an increased speed of take-up of the heated rolls and the film may be stretched up to four times its original length as emitted from the extrusion die. The films are subsequently stored by winding them onto a separate spool.

Films prepared by the process according to the invention exhibit substantially different mechanical properties to those exhibited by films prepared by conventional techniques. Generally speaking, films formed in accordance with the present invention can be obtained in which the average tensile strength parallel to the extrusion axis is from about 1000 to about 1300 p.s.i and the % elongation before failure of the film is from about 80% to about 240%.

The extruded films manufactured by the method according to the invention have many applications and may be used in place of films produced by the prior art methods. However, the Applicant has discovered that the films of the present invention are particularly suitable for use in the manufacture of amylosic film laminate structures exhibiting oxygen barrier properties.

Materials exhibiting oxygen barrier properties are generally used in the food industry as wrappings but are also moulded to provide food containers. Oxygen barrier resins currently used for this purpose include polyvinylidene chloride (PVDC), ethylene vinyl alcohol co-polymer (EVOH), polyacrylonitrile (PAN) and other nitrile polymers, modified polyamide resins, polytetrafluoroethylene (PTFE), polyethylene terephthalate (PET) and other polyesters, and co-polymers of other resins with one or more oxygen barrier resins.

In order to use these resins in practical applications it is frequently necessary to combine them in a multilayer structure with other resins. This is done to add strength to the film, to protect the oxygen barrier layer, to confer moisture resistance or heat sealing ability to the film or to aid in further processing. These additional layers may be applied to one or both sides of the oxygen barrier resin. Additionally the multilayer structure may contain more than one barrier layer.

It is known to coat amylosic films with various polymer solutions in order to strengthen the films, confer moisture resistance to the film or to aid in further processing. However, as discussed previously, hitherto, the techniques available for coating these films have proven to be inefficient, time consuming and costly.

In contrast, the Applicant's method provides a simpler and cheaper procedure for applying these polymeric coatings to the amylose derived films so as to form laminate structures whereby an amylosic film may be co-formed with the polymeric material without the need to first remove excess water from the film.

The co-forming technique employed may be any one of those currently used in the plastic industry, for example thermal lamination, co-injection moulding or co-extrusion using the cast (flat die) method or in blown film production. Alternatively, the film may be coated immediately after extrusion with the polymeric material by way of spraying, brushing or dipping without the need to predry the film.

Depending on the intended application of the barrier film, a wide range of polymers are suitable for use in the manufacture of amylose film laminate structures according to the present invention. These include polypropylene, polyethylene or co-polymers of these, polyvinylchloride, polycarbonate, polystyrene, polyester, ionomer resins, acrylates and nylon compounds. Recycled plastic or regrind may be incorporated also.

It is sometimes necessary to form an adhesive "tie layer" intermediate the film and polymeric coating. These tie layers are generally blends of modified or functionalised polymers used in the polymeric coating or specially formulated adhesives. Examples in use include modified polyolefins, and nitrile, vinyl, urethane, butyl, acrylic or polyester based systems.

Amylosic film laminate structures containing up to seven layers (including tie layers) may be fabricated for barrier applications. Thickness of the layers vary depending on application. The barrier layers can range from 1 micron to 500 microns in thickness and generally the other laminations in the structure are at least as thick as the oxygen barrier layer.

The films produced according to the present invention are also particularly suitable for use as biodegradable agricultural mulch films and for that purpose are preferably films manufactured by blow moulding. It has not previously been known to blow mould amylosic materials.

Mulch films are used in agriculture to control weed growth, retain soil moisture and to reduce nutrient leaching by rainfall. Mulch films presently in use are largely non biodegradable and are produced from hydrocarbon polymers such as polyethylene. Being non biodegradable, the films must either be ploughed into the soil between growing seasons thereby causing pollution and contamination of the soil or must be removed at some cost to the user.

Although attempts have been made to produce degradable films from petroleum derived polymers by the incorporation of additives that aid breakdown of the film, most of these products degrade in a way that leaves a finely divided residue of plastic material behind which is not itself readily degradable. In addition, the presence of degradation accelerators in plastics is contrary to sound environmental principles and also to the concept of scrap plastic recycling. Accordingly, the concept of a biodegradable film is highly desirable.

The Applicant has discovered that the high amylose derived starch films of the present invention will completely degrade over a period of time when left in contact with the soil. Further, they are advantageous in that they exhibit tensile strength properties comparable to commercially used hydrocarbon derived films.

Further, the physical characteristics and degradation rates of the films may be modified by the addition of stabilizers and other materials which protect the films to an extent from ultraviolet light present in sunlight.

By way of further explanation, the following specific examples are provided.

In these examples, the extrusion was carried out with a ZSK40 twin screw co-rotating machine produced by Werner and Pfleiderer. Screws having a length to diameter ratio of 36:1 were employed and the extruder was fitted with nine barrel segments. Vacuum venting was provided in the final segment of the barrel immediately before the die. The vacuum pump enabled the pressure in the final segment to be lowered to about 200 mbar.

All proportions given herein are by weight unless otherwise indicated.

The oxygen permeability tests were carried out in accordance with the method developed by the CSIRO Food Research Laboratory, North Ryde, NSW, Australia and described in Die Angewandte Makromolekulare Chemie 88 (1980) 209–221 (No.1367) by R. V Holland, M. L. Rooney and R. A. Santangelo.

The results of the oxygen permeability tests are expressed in "Barrers", a unit developed by the trade to compare the diffusion rates in polymers. A low Barrer number indicates a good oxygen barrier property.

The mechanical properties of the films were determined using an Instron Universal test machine having a machine cross head speed of 100 mm/min and a sample gauge length of 52 mm. The tests were conducted at ambient humidity and temperatures and the cross-sectional area of the sample calculated by measuring the sample dimensions before the test. The breaking force was measured by the Instron machine and the tensile strength determined as a function of force per unit area.

Biodegredation tests were carried out on the films produced by examples 4 to 8. These tests involved equilibrating a number of soil samples over a range of relative humidities in sealed containers. A known weight of each of the starch films was buried in the soil and the containers were then maintained at a constant temperature for one month. At the end of this period, the remains of the starch films were removed from the soil and reweighed. After correcting for changes in the moisture content of the film, the loss in weight of the starch sample over the month period was taken as an indication of the biodegradation rate.

EXAMPLE 1

In this example, 82% of high amylose maize starch derived from the Goodman Fielder Mills Pty Ltd maize hybrids 55/77 or 65/88, 10% of glycerol and 8% of added water were mixed in a Z-arm blender to form a free flowing powder. The free flowing powder composition was fed into the extrusion equipment described previously and heated to a temperature of 160° C. Immediately prior to extrusion, vacuum stripping at a pressure of less than 200 mbar was used to remove moisture. The composition was then extruded through a circular die at a temperature of 130° C. The resulting rod was cooled briefly and pelletized into granules of approximately 5 mm in diameter.

These granules were then fed into an extruder fitted with a flat film die and blended with added water in the proportion of about 5.5% by weight of the total mass at a temperature of 180° C. and a pressure sufficient to form a hot melt. Vacuum stripping at a pressure of less than 200 mbar was again employed to remove excess water and the melt extruded as a film through a flat film die having a temperature of 110° C.

The extruded film was taken up on heated rollers which were maintained at a temperature of 70° C. The film was stretched to four times its original length by the tension derived from an increased speed of take up of the heated rolls. The film was then stored by winding it onto a separate spool.

A thermal laminator was used to coat the starch film on both sides with a film of bi-axially oriented polypropylene, using a hot melt adhesive to ensure proper bonding between the three layers.

The oxygen permeability of the film was evaluated at a range of relative humidities and the results illustrated in table 1.

These results show that the amylosic barrier film prepared according to the invention exhibits excellent oxygen barrier properties which are preserved irrespective of the ambient humidity by coating the starch derived film with a polymer.

EXAMPLE 2

In this example the high amylosic material was derived from modified amylose maize starch and more particularly from hydroxypropylated high amylose maize starch derived from the Goodman Fielder Mills Pty Ltd maize hybrids 55/77 or 65/88.

The hydroxypropylated high amylose starch was prepared by slurrying an amount of high amylose maize starch having an amylose content of 55% in tap water to make a 32% suspension. Sodium chloride was added to the slurry at the rate of 4 kg NaCl per 100 kg Of dry starch. A caustic soda solution was then added to the suspension in sufficient quantities so that when 100 mls sample of starch slurry was titrated with 0.5N hydrochloric acid, a titre of between 25 and 27 mls was obtained.

The starch slurry was then transferred to a sealed pressure vessel and the head space above the slurry purged with nitrogen to remove residual air. Propylene oxide was introduced into the slurry by means of a sparge tube at the rate of 4.5 kg propylene oxide per 100 kg of dry starch and dispersed through the slurry by mechanical stirring. The temperature of the reaction mixture was raised to 46° C. by external heating and maintained at this temperature for 22 hours under constant agitation.

The reaction mixture was subsequently neutralized with hydrochloric acid to pH 6.0, the slurry filtered and the collected starch washed with water. The hydroxypropylated amylose maize starch was then air dried and collected as a free flowing powder.

A composition comprising this powder, glycerol and added water was then prepared for extrusion into a rod. The composition was prepared by mixing in the barrel of the extrusion equipment described previously 64% of the powder, 28% glycerol and 8% added water at a temperature of 160° C. and an elevated pressure. Vacuum stripping at a pressure of less than 200 mbar was employed to remove excess volatiles including water prior to extrusion through a rod die at 95° C.

The resulting rod was cooled briefly and pelletized into granules of approximately 5 mm in diameter. These granules were then fed into one extruder component of a co-extrusion installation. The granules were mixed with an additional 5.5% of water by weight of the granules at a temperature of 173° C. Thereafter, the composition was cooled to approximately 155° C. Vacuum stripping at a pressure of less than 200 mbar was employed just prior to the co-extrusion to ensure excess volatiles were removed.

Two other extruders in the co-extrusion installation were set up to process polypropylene (pp) and ethylenevinylacetate (eva) respectively. EVA was used as the glue layer intermediate the layer of polypropylene and the modified starch film. The subsequent extrusion step resulted in a multilayer film consisting of pp-eva-hydroxypropylated high amylose starch film-eva-pp.

The resulting laminate structure exhibited low oxygen permeability over a range of relative humidities as illustrated in table 2.

EXAMPLE 3

In this example the amylosic film was derived from acetylated high amylose maize starch. The modified starch was prepared by dispersing 250 kg of high amylose maize starch having an amylose content of 55% in 400 liters of water by mechanical stirring in a reaction vessel. The pH of the slurry was adjusted to pH 8.0 using 0.65N sodium hydroxide solution. 1.05 liters of hydrogen peroxide was then added to the reaction vessel and stirring continued for 45 minutes. Acetic anhydride was slowly added to the slurry with stirring while simultaneously adding 0.65N sodium hydroxide solution to maintain the pH between pH 8.0 and 8.5. A total of 17.5 liters of acetic anhydride was added in this manner.

The slurry was mixed for 30 minutes then neutralized with hydrochloric acid to pH 6.0. After filtering, washing and drying, the resulting acetylated high amylose maize starch was collected as a free flowing powder.

A composition of the acetylated starch powder, plasticizer and water was prepared for extrusion as a rod. The composition was prepared by mixing 62% acetylated starch powder, 29% glycerol and 9% added water at a temperature of 200° C. Vacuum stripping at a pressure of less than 200 mbar was employed to remove excess volatiles including water prior to extrusion through a rod die at 128° C. The resulting rod was cooled briefly and pelletized into granules as before.

The granules were then fed into an extruder, additional water in the proportion of 5.5% of the total mass added and the composition mixed at 150° C. Vacuum stripping at a pressure of less than 200 mbar was employed to remove excess volatiles from the melt prior to extrusion through a flat film die at 60° C.

The resulting film was then treated in the manner described for example 1 and the film stored by winding it onto a separate spool.

Both the sides of the stored film were subsequently coated with a moisture proof nitrocellulose coating using techniques commonly employed to produce coated cellophane.

The resulting laminate exhibited low oxygen permeability over a range of relative humidities as illustrated in table 3.

EXAMPLE 4

In this example, the amylosic film was derived from carboxymethylated high amylose maize starch.

A reagent solution was prepared by admixing 315 liters of water, 13.2 kg sodium hydroxide and 87.5 kg sodium chloride in a small reaction vessel equipped with a mechanical stirrer. Mechanical stirring continued until the solids were completely dissolved.

In a separate reaction vessel, 250 kg of high amylose maize starch was dispersed in 360 liters of water by mechanical stirring. The resulting starch slurry was heated to a temperature of 45° C. 31.25 kg of sodium monochloroacetate was added to the slurry and the reaction mixture stirred for 5 minutes.

The contents of this reaction vessel were then combined with the reagent solution and the resulting mixture heated to a temperature of 53° C. This temperature was maintained and the reaction allowed to continue over a period of 24 hours with mechanical stirring.

The slurry was subsequently neutralized to pH 6.0 with hydrochloric acid, the slurry filtered and the collected carboxymethylated starch air dried and collected as a free flowing powder.

A composition of the carboxymethylated starch powder, glycerol and added water was then prepared for extrusion into a rod. The composition was prepared by mixing in the barrel of the extrusion equipment described previously 62% of the carboxymethylated starch powder, 29% glycerol and 9% added water at a temperature of 120° C. under elevated pressure. Vacuum stripping at a pressure of less than 200 mbar was employed to remove excess volatiles including water prior to extrusion through a rod die at 88° C.

The resulting rod was cooled briefly and pelletized into granules of approximately 5 mm in diameter. These granules were then fed into the centre extruder component of a three extruder blown film co-extrusion installation. The starch granules were then prepared for extrusion by elevating the temperature in the barrel to between 140° and 160° C. No added water was utilized. Vacuum stripping at a pressure of less than 200 mbar was employed in this extruder to remove excess volatiles prior to co-extrusion.

The two other extruders in the co-extrusion installation were both set up to process polyethylene. The equipment was operated at standard operating conditions to produce a blown carboxymethylated high amylose starch film sandwiched between two layers of polyethylene.

The resulting laminate was then stored by winding it onto a separate spool.

The resulting laminate exhibited low oxygen permeability over a range of relative humidities as illustrated in table 4.

EXAMPLE 5

In this example, the free flowing starch granules prepared according to example 1 were fed into the extruder described in that example.

A composition of these granules was then prepared for extrusion as a film by blending these granules with added water in the proportion of about 5.5% by weight of the total mass and a small amount of carbon black at a temperature of 180° C. and a pressure sufficient to form a hot melt.

The carbon black containing mass was then extruded as a film and treated as per example 1 although the film was not subsequently coated.

The mechanical properties of the uncoated film were evaluated and the results illustrated in table 5. The tensile strength measurements indicate that the film has comparable mechanical properties to polyethylene film processed on the same equipment.

Biodegradation tests were then carried out on a film sample. From table 6, it can be seem that the high amylose starch film degrades over time over a range of soil moisture conditions.

EXAMPLE 6

In this example, a composition of the hydroxypropylated starch granules prepared according to example 2 were fed into an extruder fitted with a slit type film die and blended with a small amount of carbon black and added water in a proportion of about 5.5% by weight of the total mass. The granules were mixed at a temperature of 173° C. Thereafter the composition was cooled to approximately 155° C. Vacuum stripping at a pressure of less than 200 mbar was employed just prior to extrusion through the die having a temperature of 100° C. to ensure that excess volatiles were removed.

The extruded film was air cooled and then taken up on rolls where it was stretched to approximately 1.6 times its original length by the tension derived from an increased speed of take-up of the rolls. The film was then stored by winding it onto a separate spool.

The mechanical properties of the resulting film are indicated in table 5. Biodegradation tests were carried out on the film and the results tabulated in table 7.

EXAMPLE 7

Granules of acetylated amylosic material were prepared in accordance with example 3 and then fed into an extruder fitted with the flat film die. An extrudable mass was prepared by blending these granules together with 5.5% by weight of added water, carbon black and calcium carbonate at a temperature of 150° C. Vacuum stripping at a pressure of less than 200 mbar was employed to remove excess volatiles including water from the melt prior to extrusion through the die at 60° C.

The resulting film was taken up on rolls heated to a temperature of 70° C. The film was stretched to four times its original length by the tension derived from an increased speed of take up of the heated rolls. The film was then stored by winding it onto a separate spool.

The mechanical properties of this film are tabulated in table 5. The rate of biodegradation of the film was evaluated and the results shown in table 8.

EXAMPLE 8

In this example, the carboxymethylated amylosic granules prepared in accordance with example 4 were fed into an extruder fitted with a flat film die, together with an amount of alumina and calcium carbonate. No additional water was added to the mass. The components were blended at a temperature of between 140 and 160° C. Vacuum stripping at a pressure of less than 200° mbar was employed to removed excess volatiles from the melt immediately prior to extrusion at a temperature of 90° C.

The resulting film was air cooled and stored by winding it onto a separate spool.

The mechanical properties of the film are tabulated in table 5. The rate of biodegradation of the film was evaluated and the results tabulated in table 9.

It will be appreciated that while the process has been exemplified with reference to a first extrusion to produce granules or pellets and to a second extrusion to form a film, it is not necessary to conduct two separate extrusions and the benefits of the invention may be obtained with a single extrusion. Similarly, it is not essential to apply a Sub-atmospheric pressure to the hot melt prior to a first extrusion if the resulting extrudate is to be re-extruded and if a sub-atmospheric pressure is to be applied before the final extrusion.

TABLE 1
PERMEABILITY TO OXYGEN AT DIFFERENT RELATIVE HUMIDITY (HIGH AMYLOSE MAIZE STARCH FILM)
Temperature of Tests = 26 deg. C.

| Sample | Permeability to Oxygen (Barrer) | | |
|---|---|---|---|
| | at 11% R.H. | at 52% R.H. | at 75% R.H. |
| Unprotected film | <0.01 | 0.1 | approx 6.0* |
| Laminated film | <0.01 | <0.01 | <0.01 |

TABLE 2
PERMEABILITY TO OXYGEN AT DIFFERENT RELATIVE HUMIDITY (HYDROYPROPYL HIGH AMYLOSE MAIZE STARCH FILM)
Temperature of Tests = 26 deg. C.

| Sample | Permeability to Oxygen (Barrer) | | |
|---|---|---|---|
| | at 11% R.H. | at 52% R.H. | at 75% R.H. |
| Unprotected film | <0.01 | 0.03 | approx. 2.0* |
| Co-extruded film | <0.01 | <0.01 | <0.01 |

*Values unstable and difficult to measure accurately.

Note[1] Barrer = $\frac{ml\,(STP) \times cm}{cm^2 \times sec \times cmHg} \times 10^{10}$

TABLE 3
PERMEABILITY TO OXYGEN AT DIFFERENT RELATIVE HUMIDITY (ACETYLATED HIGH AMYLOSE MAIZE STARCH FILM)
(Temperature of Tests = 26 deg. C.)

| Sample | Permeability to Oxygen (Barrer) | | |
|---|---|---|---|
| | at 11% R.H. | at 52% R.H. | at 75% R.H. |
| Unprotected film | <0.01 | 0.11 | approx 6.0* |
| Coated film | <0.01 | <0.01 | <0.01 |

TABLE 4
PERMEABILITY TO OXYGEN AT DIFFERENT RELATIVE HUMIDITY (CARBOXYLMETHYL HIGH AMYLOSE MAIZE STARCH FILM)
Temperature of Tests = 26 deg. C.

| Sample | Permeability to Oxygen (Barrer) | | |
|---|---|---|---|
| | at 11% R.H. | at 52% R.H. | at 75% R.H. |
| Unprotected film | <0.01 | 0.1 | approx. 7.0* |
| Co-extruded film blown film | <0.01 | <0.01 | <0.01 |

*Values unstable and difficult to measure accurately.

Note[1] Barrer = $\frac{ml\,(STP) \times cm}{cm^2 \times sec \times cmHg} \times 10^{10}$

TABLE 5
TENSILE STRENGTH DATA

| Film Type | Average Tensile Strength (P.S.I.) | Average Elongation Before Failure (%) |
|---|---|---|
| High Amylose Maize | 1055 | 92 |
| Hydroxypropyl High Amylose Maize Starch | 1204 | 210–237 |
| Acetylated High Amylose Maize Starch | 1233 | 123 |
| Carboxymethyl High Amylose Maize Starch | 1021 | 80 |
| Polyethylene | 1131 | 85 |

TABLE 6
BIODEGRADATION TESTS
HIGH AMYLOSE MAIZE STARCH
Temperature of Test - 30 deg. C.
Duration of Test - One Month

| Conditions of Test | % Degradation (loss in weight) |
|---|---|
| Low Moisture | 12 |
| Medium Moisture | 37 |
| High Moisture | 93 |
| Flooded | 87 |

TABLE 7
BIODEGRADATION TESTS
HYDROXYPROPYL HIGH AMYLOSE MAIZE STARCH
Temperature of Test - 15 deg. C.
Duration of Test - One Month

| Conditions of Test | % Degradation (loss in weight) |
|---|---|
| Low Moisture | <1 |
| Medium Moisture | 1 |
| High Moisture | 2 |
| Flooded | 86 |

TABLE 8
BIODEGRADATION TESTS
ACETYLATED HIGH AMYLOSE MAIZE STARCH
Temperature of Test - 15 deg. C.
Duration of Test - One Month

| Conditions of Test | % Degradation (loss in weight) |
|---|---|
| Low Moisture | <1 |
| Medium Moisture | <1 |
| High Moisture | 4 |
| Flooded | 70 |

TABLE 9
BIODEGRADATION TESTS
CARBOXYMETHYL HIGH AMYLOSE MAIZE STARCH
Temperature of Test - 30 deg. C.
Duration of Test - One Month

| Conditions of Test | % Degradation (loss in weight) |
|---|---|
| Low Moisture | 10 |
| Medium Moisture | 27 |
| High Moisture | 92 |
| Flooded | 90 |

Although the invention has been described with reference to specific examples, it would be appreciated by those skilled in the art that the invention may be embodied in many other forms

I claim:

1. A method of manufacturing a starch derived shaped article comprising the steps of:

(1) preparing a hot melt by heating a composition comprising (a) a high amylosic material, or a derivative thereof, said derivative being selected from the group consisting of amylosic ethers, amylosic esters and combinations thereof and (b) water, the water being present in an amount of less then 24% by weight, at an elevated temperature and pressure below the temperature and pressure at which the material or derivative decomposes to provide a homogeneous melt;

(2) extruding the hot melt from an extruder to form a shaped article; and (3) subjecting the hot melt to a subatmospheric pressure prior to issue from the extruder whereby to remove water from the shaped article.

2. A method according to claim 1 wherein the subjecting of step (3) is at a pressure of 0 to 200 mbar.

3. A method according to claim 1 wherein the high amylosic material is derived from maize plants.

4. A method according to claim 1, wherein the derivative is selected from the group consisting of carboxymethylated, hydroxypropylated and acetylated derivatives.

5. A method according to claim 1 wherein the composition for preparing a hot melt comprises 0 to about 9.0% by weight of added water.

6. A method according to claim 5 wherein said composition comprises from about 3% to about 8% by weight of added water.

7. A method according to claim 6 wherein said composition comprises about 5.5% by weight of added water.

8. A method according to claim 5 wherein the composition for preparing a hot melt comprises an amylosic composition containing from about 9% to about 15% of moisture and no added water.

9. A method according to claim 1 wherein the composition for preparing a hot melt comprises a plasticizer in an amount of about 0 to 30% by weight of the composition.

10. A method according to claim 1 wherein the composition for preparing a hot melt comprises stabilizers selected from the group consisting of carbon black, alumina and calcium carbonate, coloring agents, preservatives, bactericides or a combination thereof.

11. A method according to claim 1 wherein the high amylosic material comprises plasticizer in an amount of about 0 to 30% by weight of the high amylosic material, said composition being in the form of free flowing particles prior to being formed into the hot melt.

12. A method according to claim 11 wherein the high amylosic material further comprises stabilizers selected from the group consisting of carbon black, alumina and calcium carbonate, coloring agents, preservatives, bactericides or a combination thereof.

13. A method according to claim 9 wherein the plasticizer is selected from the group consisting of polyethylene glycol, glycerol and glycerol acetate.

14. A method according to claim 1 wherein the hot melt is formed by subjecting the composition to a temperature in the range of about 120° C. to about 210° C.

15. A method according to claim 14 wherein the hot melt is extruded through a die having a temperature in the range of 60° C. to 130° C.

16. A method according to claim 1 wherein the shaped article is a rod.

17. A method according to claim 1 wherein the shaped article is a film.

18. A method according to claim 17 wherein the film is extruded by blown film techniques.

19. A method according to claim 17 wherein the film is co-formed with at least one layer of a first polymeric material so as to form a laminate comprising the starch derived film and a layer of the first polymeric material coating on at least one face thereof.

20. A method according to claim 17 wherein the film is co-formed with a first and second polymeric material to form a laminate comprising a tie layer intermediate the film and the layer of the first polymeric material, said tie layer consisting of the second polymeric material.

21. A method according to claim 17 wherein the first polymeric material is selected from the group comprising polypropylene, polyethylene, or co-polymers thereof; polyvinylchloride, polycarbonate, polystyrene, polyester, ionomer resins, acrylates and nylons.

22. A method according to claim 17 wherein the second polymeric material is a blend of modified or functionalized polymers selected from the group of the first polymeric materials.

23. A method according to claim 19 wherein the starch derived film is co-extruded with the polymeric material.

24. A method according to claim 17 wherein the starch derived film is extruded into a solution of the polymeric material.

25. A method according to claim 17 wherein the film is subsequently heated and stretched.

26. A starch derived shaped article produced by the process according to claim 1.

27. A method according to claim 17 wherein the starch derived film is coated immediately after extrusion with the polymeric material by way of spraying.

28. A method according to claim 17 wherein the starch derived film is coated immediately after extrusion with the polymeric material by way of brushing.

29. A method according to claim 17 wherein the film is co-formed with at least one layer of a hydrophobic polymeric material so as to form a laminate comprising the starch-derived film and a layer of hydrophobic polymeric material coating on at least one face thereof.

30. A method according to claim 1 wherein the high amylosic material used in step (1) is itself the product of a method according to claim 1.

31. A method according to claim 1 further comprising the steps of:

(4) preparing a hot melt by heating at an elevated temperature and pressure the shaped article from stage (2) and less than 24% by weight water to provide a homogenous melt;

(5) extruding the hot melt of step (4) to form a shaped article; and (6) subjecting the hot melt of step (4) to a subatmospheric pressure prior to issue from the extruder whereby to remove water from the hot melt prior to formation of an extrudate.

32. A method according to claim 1 wherein the high amylosic material has less amylopectin and more amylose than typical high amylose starches derived from U.S. cultivars.

33. A starch based shaped film obtained by extruding in an extrusion direction a composition comprising a high amylosic material and an amount of water, said film having an average tensile strength parallel to the extrusion direction in the range of from about 1000 psi to about 1300 psi and an average elongation before failure of from about 80% to about 240%.

34. A method according to claim 33 being incorporated in a laminate structure wherein a layer of a first polymeric material is coated on at least one face of the film.

35. A method of agriculture comprising the step of covering a tract of land with a biodegradable mulch film prepared by
   (1) preparing a hot melt by heating a composition comprising (a) a high amylosic material, or derivative thereof, said derivative being selected from the group consisting of amylosic esters, amylosic ethers and combinations thereof and (b) water, said water being present in an amount of less than 24% by weight, at an elevated temperature and pressure below the temperature and pressure at which the material or derivative decomposes to provide a homogeneous melt;
   (2) extruding the hot melt from an extruder to form a film; and
   (3) subjecting the hot melt to a subatmospheric pressure prior to issue from the extruder, whereby to remove water from the film.

36. A method of agriculture comprising the step of covering a tract of land with a biodegradable starch derived mulch film, said film having an average tensile strength parallel to the extrusion axis in the range of from about 1000 psi to about 1300 psi and an average elongation before failure of from about 80% to about 240%.

* * * * *

UNITED STATES PATENT AND TRADEMARK OFFICE
CERTIFICATE OF CORRECTION

PATENT NO. : 5,314,754
DATED : May 24, 1994
INVENTOR(S) : Adrian Timothy Knight

It is certified that error appears in the above-indentified patent and that said Letters Patent is hereby corrected as shown below:

Column 2, line 25, "mateiral" should be --material--,

Column 4, line 68, "weight o water" should be --weight of water--

Column 5, line 32, "hi9h" should be --high--

Column 9, line 48, "Of" should be --of--

Column 12, line 67, "200°" should be --200--

Column 13, line 15, "Sub-" should be -- sub- --

Column 13, Table 4, "Co-extruded film blown film" should be --Co-extruded blown film--

Signed and Sealed this

Sixth Day of September, 1994

Attest:

*Attesting Officer*

BRUCE LEHMAN

*Commissioner of Patents and Trademarks*